(12) United States Patent
Wilson

(10) Patent No.: US 8,147,683 B2
(45) Date of Patent: Apr. 3, 2012

(54) PORTABLE LUBRICANT FILTRATION SYSTEM AND METHOD

(75) Inventor: Jay Wilson, Helenville, WI (US)

(73) Assignee: Trico Corporation, Pewaukee, WI (US)

( * ) Notice: Subject to any disclaimer, the term of this patent is extended or adjusted under 35 U.S.C. 154(b) by 188 days.

(21) Appl. No.: 12/657,526

(22) Filed: Jan. 22, 2010

(65) Prior Publication Data

US 2011/0180492 A1 Jul. 28, 2011

(51) Int. Cl.
B01D 29/56 (2006.01)
(52) U.S. Cl. .......... 210/90; 210/136; 210/196; 210/252; 210/254; 210/258; 210/416.5; 210/418
(58) Field of Classification Search .................. None
See application file for complete search history.

(56) References Cited

U.S. PATENT DOCUMENTS

| | | | |
|---|---|---|---|
| 126,624 A | 5/1872 | Coffee | |
| 539,117 A | 5/1895 | Busch | |
| 779,357 A | 1/1905 | Gardner | |
| 805,645 A | 11/1905 | Guillott | |
| 992,503 A | 5/1911 | Howard | |
| 1,113,276 A | 10/1914 | Woodmansee | |
| 1,571,495 A | 2/1926 | Smith | |
| 1,600,262 A | 9/1926 | Wickham | |
| 1,610,283 A | 12/1926 | Hill | |
| 1,687,395 A | 10/1928 | Shew | |
| 1,688,279 A | 10/1928 | Locke | |
| 1,721,444 A * | 7/1929 | Habel | 134/168 R |
| 1,829,173 A * | 10/1931 | Wertz | 184/1.5 |
| 1,864,195 A | 6/1932 | Hall | |
| 1,955,199 A * | 4/1934 | Menge | 134/58 R |
| 1,962,463 A * | 6/1934 | Renfrew | 196/46.1 |
| 2,029,232 A * | 1/1936 | Green | 137/625.29 |
| 2,222,516 A * | 11/1940 | Powell et al. | 134/10 |
| 2,227,646 A | 1/1941 | Hillman | |
| 2,335,557 A | 11/1943 | Winther | |
| 2,340,455 A | 2/1944 | Davis | |
| 2,376,623 A | 5/1945 | Romberg | |
| 2,397,597 A | 4/1946 | Dunkle | |
| 2,425,848 A * | 8/1947 | Vawter | 210/167.31 |
| 2,439,709 A | 4/1948 | Ashbury | |
| 2,499,705 A * | 3/1950 | Vokes | 184/1.5 |
| 2,510,701 A * | 6/1950 | La Cross | 134/95.1 |
| 2,589,081 A | 3/1952 | Hertz | |
| 2,608,993 A | 9/1952 | Andrews | |
| 2,619,974 A * | 12/1952 | Daley et al. | 134/56 R |
| 2,635,756 A * | 4/1953 | Grieve et al. | 210/95 |

(Continued)

FOREIGN PATENT DOCUMENTS

CA 2291763 7/2002

(Continued)

OTHER PUBLICATIONS

International Search Report, dated Jan. 20, 1999 for PCT/US98/09039, International Filing Date May 8, 1998.

(Continued)

*Primary Examiner* — Robert James Popovics
(74) *Attorney, Agent, or Firm* — Ryan Kromholz & Manion, S.C.

(57) ABSTRACT

A portable lubricant filtration system and method is provided for facile pre-filtering of used or new lubricant prior to pumping the lubricant into its intended machinery.

1 Claim, 4 Drawing Sheets

U.S. PATENT DOCUMENTS

| | | | |
|---|---|---|---|
| 2,685,347 A * | 8/1954 | Busby | 184/1.5 |
| 2,703,628 A | 3/1955 | Pompeo e al. | |
| 2,738,877 A * | 3/1956 | Beach | 210/149 |
| 2,774,621 A | 12/1956 | Kilbourne, Jr. | |
| 2,835,261 A * | 5/1958 | Wogan | 134/56 R |
| 2,930,432 A | 3/1960 | Engstrom | |
| 2,950,943 A | 8/1960 | Forrest | |
| 2,995,213 A | 8/1961 | Gross | |
| 3,115,145 A * | 12/1963 | Monteath, Jr | 134/95.1 |
| 3,123,095 A | 3/1964 | Kohler | |
| 3,193,990 A | 7/1965 | Smith | |
| 3,233,173 A | 2/1966 | Lees et al. | |
| D205,166 S | 6/1966 | Price | |
| 3,279,605 A * | 10/1966 | Shepherd | 210/110 |
| 3,323,291 A | 6/1967 | Kern | |
| 3,338,262 A | 8/1967 | Chopelin | |
| 3,394,812 A * | 7/1968 | Cohen et al. | 210/134 |
| 3,431,145 A * | 3/1969 | Riley | 134/22.18 |
| 3,447,562 A | 6/1969 | Hoffman | |
| 3,473,662 A * | 10/1969 | Kudlaty | 210/100 |
| 3,489,245 A * | 1/1970 | Broadwell | 184/1.5 |
| D217,665 S | 5/1970 | Self | |
| D217,666 S | 5/1970 | Self | |
| D217,667 S | 5/1970 | Self | |
| 3,759,388 A * | 9/1973 | Thomason | 210/167.28 |
| 3,810,487 A * | 5/1974 | Cable et al. | 137/351 |
| 3,952,566 A | 4/1976 | Jacobson | |
| 3,954,611 A * | 5/1976 | Reedy | 210/695 |
| 4,015,613 A * | 4/1977 | Papworth | 134/102.2 |
| 4,018,579 A | 4/1977 | Hofmann | |
| 4,047,814 A | 9/1977 | Westcott | |
| 4,058,766 A | 11/1977 | Vogel et al. | |
| 4,059,123 A * | 11/1977 | Bartos et al. | 134/102.2 |
| 4,064,455 A | 12/1977 | Hopkins et al. | |
| 4,095,673 A * | 6/1978 | Takeuchi | 184/1.5 |
| 4,105,092 A | 8/1978 | Zeidler et al. | |
| 4,127,160 A * | 11/1978 | Joffe | 165/95 |
| 4,128,140 A * | 12/1978 | Riches | 184/1.5 |
| 4,153,553 A * | 5/1979 | Davis | 210/95 |
| 4,227,419 A | 10/1980 | Park | |
| 4,276,914 A * | 7/1981 | Albertson | 141/92 |
| 4,312,424 A | 1/1982 | Taylor et al. | |
| 4,345,668 A | 8/1982 | Gaunt | |
| 4,423,371 A | 12/1983 | Senturia et al. | |
| 4,445,168 A | 4/1984 | Petryszyn | |
| 4,466,508 A | 8/1984 | Busch | |
| 4,503,383 A | 3/1985 | Agar | |
| D279,549 S | 7/1985 | Elmburg | |
| 4,527,661 A | 7/1985 | Johnstone et al. | |
| 4,534,869 A * | 8/1985 | Seibert | 210/788 |
| 4,591,024 A | 5/1986 | Erickson | |
| 4,591,434 A * | 5/1986 | Prudhomme | 210/117 |
| 4,606,363 A * | 8/1986 | Scales | 134/111 |
| 4,623,455 A * | 11/1986 | Adcock | 210/167.04 |
| 4,629,334 A | 12/1986 | Hochstein | |
| 4,646,070 A | 2/1987 | Yasuhara | |
| 4,681,189 A | 7/1987 | Krisiloff | |
| 4,689,553 A | 8/1987 | Haddox | |
| 4,702,827 A * | 10/1987 | Wenzel | 210/117 |
| 4,733,556 A | 3/1988 | Meitzler et al. | |
| 4,735,286 A | 4/1988 | Miki et al. | |
| 4,738,336 A | 4/1988 | Smith et al. | |
| 4,747,944 A * | 5/1988 | George | 210/167.28 |
| 4,772,402 A * | 9/1988 | Love | 210/804 |
| 4,787,348 A * | 11/1988 | Taylor | 123/198 A |
| 4,836,921 A * | 6/1989 | Hahn et al. | 210/202 |
| 4,840,223 A * | 6/1989 | Lee | 165/95 |
| 4,872,997 A * | 10/1989 | Becker | 210/703 |
| 4,877,043 A * | 10/1989 | Carmichael et al. | 134/57 R |
| 4,925,496 A * | 5/1990 | Stouky et al. | 134/22.18 |
| 4,959,144 A * | 9/1990 | Bernard et al. | 210/232 |
| 4,977,872 A * | 12/1990 | Hartopp | 123/198 A |
| 4,990,057 A | 2/1991 | Rollins | |
| 4,991,608 A * | 2/1991 | Schweiger | 134/56 R |
| 5,015,301 A * | 5/1991 | Baylor et al. | 134/22.1 |
| 5,025,222 A | 6/1991 | Scott et al. | |
| 5,026,488 A * | 6/1991 | Mesheau | 210/799 |
| 5,039,425 A | 8/1991 | Caris et al. | |
| 5,045,798 A | 9/1991 | Hendrick | |
| 5,060,760 A | 10/1991 | Long et al. | |
| 5,062,500 A * | 11/1991 | Miller et al. | 184/106 |
| 5,063,896 A * | 11/1991 | Hyatt et al. | 123/198 A |
| 5,071,527 A | 12/1991 | Kauffman | |
| 5,072,190 A | 12/1991 | Martin | |
| 5,076,856 A * | 12/1991 | Schweiger | 134/18 |
| 5,080,195 A | 1/1992 | Mizumoto et al. | |
| 5,091,085 A * | 2/1992 | Thalmann et al. | 210/321.65 |
| 5,098,580 A * | 3/1992 | Andersen | 210/745 |
| 5,101,936 A | 4/1992 | Paredes et al. | |
| 5,103,181 A | 4/1992 | Gaisford et al. | |
| 5,104,529 A * | 4/1992 | Becker | 210/195.1 |
| 5,125,480 A | 6/1992 | Gregory et al. | |
| 5,139,678 A * | 8/1992 | Frederick et al. | 210/641 |
| 5,160,443 A * | 11/1992 | Mesheau | 210/799 |
| D333,177 S | 2/1993 | Poirier | |
| 5,186,212 A | 2/1993 | Stephenson et al. | |
| 5,196,898 A | 3/1993 | Tamura et al. | |
| 5,197,569 A | 3/1993 | Roessler et al. | |
| 5,200,027 A | 4/1993 | Lee et al. | |
| 5,203,680 A | 4/1993 | Waldrop | |
| D336,509 S | 6/1993 | Safford et al. | |
| D336,679 S | 6/1993 | Safford et al. | |
| 5,224,051 A | 6/1993 | Johnson | |
| 5,228,985 A * | 7/1993 | Wells et al. | 210/167.28 |
| D338,158 S | 8/1993 | Poirier | |
| 5,232,513 A * | 8/1993 | Suratt et al. | 134/21 |
| 5,238,085 A * | 8/1993 | Engelmann | 184/1.5 |
| 5,249,455 A | 10/1993 | Cox | |
| 5,260,665 A | 11/1993 | Goldberg et al. | |
| 5,262,732 A | 11/1993 | Dickert et al. | |
| 5,269,175 A | 12/1993 | Chmiel et al. | |
| 5,271,528 A | 12/1993 | Chien | |
| 5,273,134 A | 12/1993 | Hegemier et al. | |
| 5,274,335 A | 12/1993 | Wang et al. | |
| 5,277,827 A * | 1/1994 | Osborne | 210/787 |
| 5,289,837 A * | 3/1994 | Betancourt | 134/57 R |
| 5,314,613 A | 5/1994 | Russo | |
| 5,317,252 A | 5/1994 | Kranbuehl | |
| 5,318,080 A * | 6/1994 | Viken | 141/98 |
| 5,318,152 A | 6/1994 | Ehlert | |
| 5,318,700 A * | 6/1994 | Dixon et al. | 210/712 |
| 5,328,275 A | 7/1994 | Winn et al. | |
| 5,330,636 A | 7/1994 | Reichert | |
| 5,332,064 A | 7/1994 | Liu | |
| 5,334,941 A | 8/1994 | King | |
| 5,381,874 A | 1/1995 | Hadank et al. | |
| 5,382,942 A | 1/1995 | Raffa et al. | |
| 5,390,636 A * | 2/1995 | Baylor et al. | 123/198 A |
| 5,395,514 A * | 3/1995 | Siegler | 210/85 |
| D358,097 S | 5/1995 | Leibowitz | |
| D358,548 S | 5/1995 | Platte | |
| 5,413,716 A * | 5/1995 | Osborne | 210/787 |
| 5,417,851 A * | 5/1995 | Yee | 210/167.01 |
| 5,457,396 A | 10/1995 | Mori et al. | |
| 5,460,656 A * | 10/1995 | Waelput et al. | 134/10 |
| 5,499,902 A | 3/1996 | Rockwood | |
| 5,504,573 A | 4/1996 | Cheiky-Zelina | |
| 5,521,515 A | 5/1996 | Campbell | |
| 5,540,086 A | 7/1996 | Park et al. | |
| 5,542,499 A | 8/1996 | Westermeyer | |
| 5,548,217 A | 8/1996 | Gibson et al. | |
| 5,568,842 A | 10/1996 | Otani | |
| 5,596,266 A | 1/1997 | Mori et al. | |
| 5,597,601 A * | 1/1997 | Griffin | 426/417 |
| 5,604,441 A | 2/1997 | Freese | |
| 5,614,830 A | 3/1997 | Dickert et al. | |
| 5,626,170 A * | 5/1997 | Parker | 141/98 |
| 5,634,531 A | 6/1997 | Graf et al. | |
| 5,647,735 A | 7/1997 | Rockwood | |
| 5,656,767 A | 8/1997 | Garvey, III et al. | |
| 5,671,825 A | 9/1997 | Wong et al. | |
| 5,674,401 A | 10/1997 | Dickert et al. | |
| 5,702,592 A | 12/1997 | Suri et al. | |
| 5,720,874 A * | 2/1998 | Siegler | 210/85 |
| 5,754,055 A | 5/1998 | McAdoo | |
| 5,772,871 A * | 6/1998 | Lyon et al. | 210/167.02 |
| 5,779,005 A | 7/1998 | Jones, Jr. et al. | |

| Patent No. | | Date | Inventor(s) |
|---|---|---|---|
| 5,789,665 | A | 8/1998 | Voelker et al. |
| 5,806,630 | A | 9/1998 | Bernal |
| 5,816,212 | A | 10/1998 | Lindquist et al. |
| 5,824,889 | A | 10/1998 | Park et al. |
| 5,826,986 | A | 10/1998 | Adkins et al. |
| 5,858,070 | A | 1/1999 | Halm et al. |
| 5,878,842 | A | 3/1999 | Rake |
| 5,884,802 | A | 3/1999 | Leibowitz |
| 5,948,274 | A * | 9/1999 | Lyon et al. ............... 210/760 |
| 5,951,857 | A * | 9/1999 | Osborne ............. 210/167.02 |
| 6,028,433 | A | 2/2000 | Cheiky-Zelina et al. |
| 6,041,798 | A * | 3/2000 | Grigorian et al. ........ 134/169 A |
| 6,071,355 | A * | 6/2000 | Suratt .................. 134/21 |
| 6,077,330 | A | 6/2000 | Sabelstrom |
| D428,468 | S * | 7/2000 | Dea et al. ............... D23/207 |
| 6,113,676 | A | 9/2000 | Kumpulainen |
| 6,138,722 | A * | 10/2000 | Willingham ............. 141/98 |
| 6,192,025 | B1 | 2/2001 | Chen |
| 6,204,656 | B1 | 3/2001 | Cheiky-Zelina et al. |
| 6,207,051 | B1 * | 3/2001 | Anderson et al. ........ 210/237 |
| 6,213,133 | B1 * | 4/2001 | Reicks ................. 134/22.1 |
| 6,223,589 | B1 | 5/2001 | Dickert et al. |
| 6,247,325 | B1 * | 6/2001 | Muston et al. ............ 62/292 |
| 6,250,152 | B1 | 6/2001 | Klein et al. |
| 6,253,601 | B1 | 7/2001 | Wang et al. |
| 6,263,889 | B1 * | 7/2001 | Flynn et al. ............. 134/102.2 |
| 6,273,031 | B1 | 8/2001 | Verdegan et al. |
| 6,277,173 | B1 | 8/2001 | Sadakata et al. |
| 6,278,282 | B1 | 8/2001 | Marszalek |
| 6,302,167 | B1 * | 10/2001 | Hollub .................. 141/98 |
| 6,305,393 | B1 * | 10/2001 | Lin ..................... 134/169 R |
| 6,309,169 | B1 * | 10/2001 | Carlile .................. 414/498 |
| 6,368,411 | B2 | 4/2002 | Roberson, Jr. et al. |
| 6,378,657 | B2 * | 4/2002 | Viken ................... 184/1.5 |
| 6,379,540 | B2 * | 4/2002 | Reicks .................. 210/139 |
| 6,443,006 | B1 | 9/2002 | Degrave |
| 6,447,573 | B1 | 9/2002 | Rake |
| 6,449,580 | B1 | 9/2002 | Bardetsky et al. |
| 6,459,995 | B1 | 10/2002 | Collister |
| 6,460,656 | B1 | 10/2002 | Jones, Jr. et al. |
| 6,485,634 | B2 * | 11/2002 | Warren et al. ............. 210/85 |
| 6,509,749 | B1 | 1/2003 | Buelna et al. |
| 6,513,368 | B2 | 2/2003 | Bondarowicz et al. |
| 6,519,034 | B1 | 2/2003 | Engler et al. |
| 6,535,001 | B1 | 3/2003 | Wang |
| 6,551,055 | B2 | 4/2003 | Rockwood |
| 6,553,812 | B2 | 4/2003 | Park et al. |
| 6,557,396 | B2 | 5/2003 | Ismail et al. |
| 6,564,126 | B1 | 5/2003 | Lin et al. |
| 6,568,919 | B1 | 5/2003 | Fletcher et al. |
| 6,596,174 | B1 * | 7/2003 | Marcus .................. 210/695 |
| 6,615,866 | B2 * | 9/2003 | Cook .................... 137/565.19 |
| D485,189 | S | 1/2004 | Montalbano et al. |
| 6,752,159 | B1 * | 6/2004 | Kavadeles et al. ........ 134/22.12 |
| D493,593 | S * | 7/2004 | Anderson ............... D34/14 |
| 6,779,633 | B2 * | 8/2004 | Viken ................... 184/1.5 |
| 6,796,339 | B1 * | 9/2004 | Petty ................... 141/65 |
| 6,851,676 | B2 | 2/2005 | Martins et al. |
| 6,863,827 | B2 * | 3/2005 | Saraceno ............... 210/748.11 |
| 6,883,526 | B1 * | 4/2005 | Betancourt et al. ........ 134/22.1 |
| 6,923,190 | B1 * | 8/2005 | Kavadeles et al. ........ 134/22.18 |
| 6,932,856 | B2 | 8/2005 | Rake |
| 6,979,397 | B2 * | 12/2005 | Evanovich et al. ........ 210/96.1 |
| 6,986,849 | B2 * | 1/2006 | Irvine .................. 210/791 |
| 7,017,712 | B1 | 3/2006 | Rake et al. |
| 7,033,513 | B2 * | 4/2006 | Riggins et al. ........... 210/805 |
| D520,595 | S * | 5/2006 | Johnson et al. ........... D23/207 |
| D521,593 | S * | 5/2006 | Mitsis .................. D23/207 |
| 7,056,442 | B2 * | 6/2006 | Hansen ................. 210/805 |
| D527,639 | S | 9/2006 | Voss et al. |
| D528,425 | S | 9/2006 | Van Dorin et al. |
| 7,140,468 | B2 | 11/2006 | Rake et al. |
| 7,150,286 | B2 * | 12/2006 | Apostolides ............. 137/14 |
| 7,179,390 | B1 * | 2/2007 | Layton ................. 210/767 |
| 7,223,337 | B1 * | 5/2007 | Franzino et al. ........... 210/241 |
| 7,282,156 | B2 * | 10/2007 | Franzino et al. ........... 210/805 |
| 7,303,672 | B2 * | 12/2007 | Irvine .................. 210/223 |
| 7,305,998 | B2 * | 12/2007 | Watt .................... 134/22.1 |
| 7,354,511 | B2 * | 4/2008 | Becker ................. 210/167.02 |
| D573,885 | S | 7/2008 | Considine et al. |
| 7,455,784 | B2 * | 11/2008 | Irvine .................. 210/791 |
| 7,473,352 | B2 * | 1/2009 | Sundeng ................ 210/85 |
| D589,597 | S | 3/2009 | Bloch et al. |
| 7,510,662 | B1 * | 3/2009 | Hansen ................. 210/805 |
| D589,807 | S | 4/2009 | Gundrum et al. |
| D589,808 | S | 4/2009 | Gundrum et al. |
| D589,809 | S | 4/2009 | Gundrum et al. |
| 7,537,691 | B2 * | 5/2009 | Reid ................... 210/167.12 |
| 7,541,004 | B2 | 6/2009 | Niksa et al. |
| 7,546,842 | B2 * | 6/2009 | Llorente Gonzalez et al. ................... 134/111 |
| 7,674,387 | B2 * | 3/2010 | Schmidt et al. ........... 210/774 |
| 7,799,231 | B2 * | 9/2010 | Irvine .................. 210/695 |
| 7,846,342 | B2 * | 12/2010 | Johnson et al. ........... 210/774 |
| 7,993,530 | B2 * | 8/2011 | Horne .................. 210/767 |
| 2004/0035805 | A1 * | 2/2004 | Hansen ................. 210/774 |
| 2004/0256332 | A1 * | 12/2004 | Riggins et al. ........... 210/805 |
| 2005/0145548 | A1 * | 7/2005 | Rhoades ................ 210/96.2 |
| 2006/0162751 | A1 * | 7/2006 | Llorente Gonzalez et al. ................... 134/169 A |
| 2007/0045203 | A1 * | 3/2007 | Franzino et al. ........... 210/805 |
| 2007/0119789 | A1 * | 5/2007 | Layton ................. 210/805 |
| 2007/0266679 | A1 * | 11/2007 | Horne .................. 55/356 |
| 2011/0180492 | A1 * | 7/2011 | Wilson ................. 210/767 |

FOREIGN PATENT DOCUMENTS

| | | |
|---|---|---|
| CA | 2289726 | 3/2003 |
| CA | 122622 | 4/2009 |
| CA | 127725 | 5/2009 |
| CA | 127726 | 5/2009 |
| CA | 1271724 | 5/2009 |
| DE | 37325 | 3/1968 |
| GB | 121092 | 12/1918 |
| JP | 2-308916 | 12/1990 |
| JP | 411132304 | 5/1999 |

OTHER PUBLICATIONS

Iotech Catalog, p. 65, Jan. 1995.

"Model 958PF On-Line Ferrograph", *Foxboro Analytical*, (no month available) 1980, 4 pgs.

958F Series On-Line Ferregreph Installation and Operation, The Foxboro Company. (no month available) 1980, 6 pgs.

"Journal Reprints", The British Institute of Non-Destructive Testing, M.H. Jones and A.R. Massoudi, INSIGHT, vol. 37 No. 8, Aug. 1995. pp. 606-610.

"Basics of Measuring the Dielectric Properties of Materials", Hewlett Packard, (no month available) 1992, No. 1217-1.

"The Nist 60-Millimeter Diameter Cylindrical Cavity Resonator: Performance Evaluation for Permittivity Measurements", Eric J. Vanzura, Richard G. Geyer and Michael D. Janezic, Aug. 1993, National Institute of Standards and Technology Technical Note.

Measuring Moisture in Liquids; A New Method, *Sensors*, Dec. 1996 pp. 42-47.

Sensor Mediated in Situ Measurement of Moisture in Organic Liquids, Phys-Chem Scientific Corp. sales literature, date unknown.

"Hydraulic and Lubrication Systems Solutions: Water Sensor—An Essential tool for fluid condition monitoring" Pall Corporation sales literature, date unknown.

Environmental Solutions for the Military: Pall Portable Fluid Purifier, not dated; Pall Corporation web site address: www.pall.com/environ/military/solutions/products/purifier.html.

Pall Water Sendor: An essential tool for fluid condition monitoring; Pall Corporation sales literature, date unknown.

"Advancement of Predict/DLI Industrial Sensors", M.A. Cheiky-Zelina, R.W. Brown and D.E. Schuele, Department of Physics, Case Western Reserve University, Mar. 1997.

Filtration Products, Solutions for Tomorrow's Challenges, Trico sales literature, 7 pages, date unknown.

Mobile Filtration System, Oil Service Products sales literature, 1 page, date unknown.

Mobile Filtration Systems, Schroeder Industries LLC, 2 pages, date unknown.

\* cited by examiner

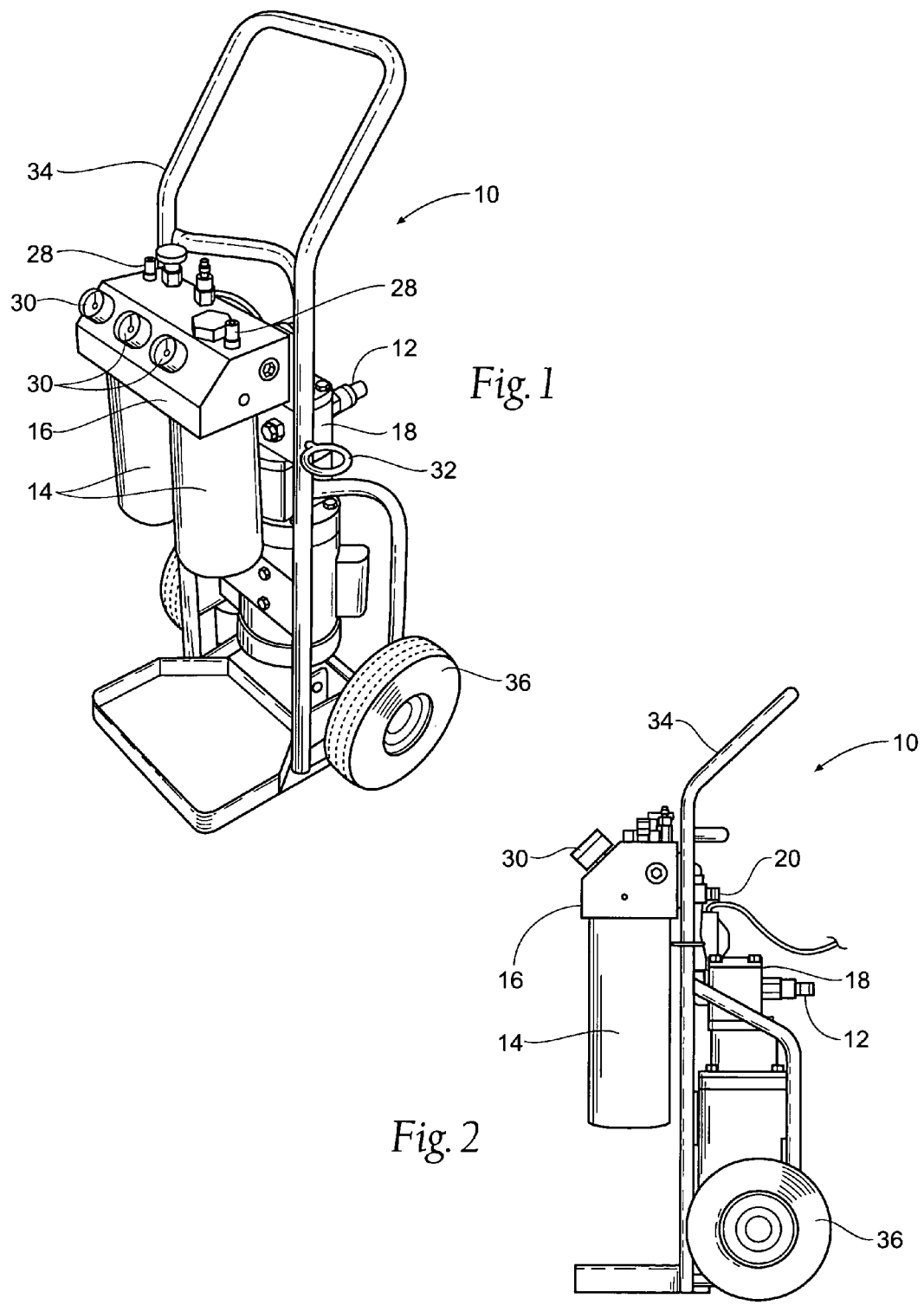

PORTABLE LUBRICANT FILTRATION SYSTEM AND METHOD

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

Lubricators supply a constant level of lubricant within a lubricant reservoir to a machine element. The lubricant level is predetermined for the particular application and cannot be changed during the operating time of the machine to which the constant level lubricator is attached. Although most lubricators provide reasonable performance in many steady-state operations, multiple variables can create unacceptable operating conditions and lead to premature wear, or even failure, of machine elements. The variables include "on" and "off" operating modes (machine cycling), oil viscosity, machine speed, lubricant temperature, lubricant vessel pressure, and lubricant condition.

Certain devices serve to indicate the status of the equipment's lubrication such as lubricant condition within acceptable levels, lubricant condition at the upper limit of acceptable levels, and lubricant condition immediate action required. These devices signal an operator when the lubricant condition is at the upper limit of acceptable levels or if immediate action is required. This reduces maintenance costs and productivity is enhanced.

The present invention relates to an apparatus and method for ensuring new and in service lubricants are applied in proper condition. The design criteria of target equipment by Original Equipment Manufacturers (OEM's) ordinarily outlines specific target cleanliness levels of lubricants to maximize the equipment life expectancy. Unfortunately, "new" lubricants may not meet the required target cleanliness code and therefore should be filtered prior to being put into service. The present apparatus and methods can be used to both filter new lubricants and to reduce contamination levels of lubricants in service. This increases equipment reliability and reduces overall maintenance costs.

Presently, there are very few devices adapted to filter lubricants having viscosities greater than 500 SUS @ 100° F. A problem with filtering a high viscosity lubricant with a lower viscosity system is that the pump and filters are not designed to work with the higher pressures required to push high viscosity fluids through the system. As a result, the known low viscosity units operate primarily in "bypass" mode where little if any of the high-viscosity lubricant gets filtered. The present portable filter cart system provides a solution, and is specifically designed for use with high-viscosity fluid lubricants, such as gear oils. Further, the present system is able to filter oils and hydraulic fluid up to 7500 SUS @ 100° F. (1600 cSt @ 40° C.). Alternatively, the present system may be used to filter oils or hydraulic fluid of medium to low viscosity of less than 2000 SUS.

SUMMARY OF THE INVENTION

The present invention is directed to a portable lubricant filtration system that is compact, self-contained, and able to remove both particulate and fluid contamination from lubricants efficiently and economically. The device may be utilized to filter lubricants in existing systems or may be used to pre-filter fluids during transfer between containers or systems, and is readily able to service multiple pieces of equipment.

Actively filtering lubricants from storage drums can prevent contamination related problems. The present system can prevent contamination or remove it when used in daily operations, including filtering lubricant directly from a storage drum to fill totes and transfer containers. The present system may supplement filtration systems and provides an inlet and outlet for continuous flow and metering of lubricants. The present system may also include inlet and outlet sampling ports for monitoring system efficacy and condition of the lubricant. The present system is capable of delivering a flow up to 4 GPM and is rated for use with lubricants up to a viscosity of 7,500 SUS, depending on motor selection. The present portable system is adapted for use with a FRL filter to remove moisture and debris from the air line and is further provided with a plurality of spin-on filter elements. Alternatively, the present system may be capable of delivering a flow up to 14 GPM when rated for use with lubricants up to a viscosity of 2,000 SUS, depending on motor selection. When pneumatic system is utilized, removal of moisture and debris from the air line is accomplished using a plurality of spin-on filter elements. Differential pressure gauges help specify the filter element condition and the need for replacement. The present invention ensures that equipment receives the cleanest lubricant possible, for increased equipment life, and therefore provides a plurality of filter elements for increased holding capacity.

Elements of the present system include:
Bypass valve to allow transfer of lubricant without filtering.
Lubricant sampling ports to monitor condition of lubricant.
Multiple filter elements—ability to utilize multiple filter elements for increased holding capacity and to remove water contamination.
Differential pressure gauges to indicate when elements need to be changed.
Heavy duty cart frame with industrial tires built for use in industrial applications and transport over large grate gaps.
Hose and wand assembly for aid in lubricant input and discharge, may be preferably constructed of heavy steel wire reinforced clear PVC hoses with long metal wands.
Drip pan to keep work area safe and clean during filter element changing:
Illustrative Specification:

| | |
|---|---|
| Pump Type | Preferably, Industrial Grade Gear Pump or Pneumatic Motor |
| Flow Capacity | 4 GPM—Electric; 3 GPM—Pneumatic |
| Pump Speed | 1725 RPM—Electric Variable Up to 3000 RPM—Pneumatic |
| Maximum Inlet Vacuum | 8" of Mercury |
| Preferred Hose Sizing @ 2 ft/sec | 1.25" Diameter @ 6 ft Long |
| Operating Temperature | 110° F. Continuous (150° F. Limited Use) |

-continued

| | |
|---|---|
| Pump By-Pass | Approximately 105 PSI |
| Filter By-Pass | Approximately 43 PSI |
| Maximum Viscosity | 1600 cSt @ 40° C./7500 SUS |
| Suitable Seal and Gasket Material | Viton ® |
| Electrical Service | 120 Volts, 20 Amps, Single Phase, 60 Hz (electric version only) |
| Air Inlet Connection | ¼" NPT Female (pneumatic version only) |
| Max. Operating Pressure | 100 PSI (pneumatic version only) |

Alternative Specification:

| | |
|---|---|
| Pump Type | Preferably, Industrial Grade Gear Pump |
| Flow Capacity | 14 GPM—Electric |
| Pump Speed | 1725 RPM—Electric Variable |
| Maximum Inlet Vacuum | 8" of Mercury |
| Preferred Hose Sizing @ 2 ft/sec | 1.00" Diameter @ 6 ft Long |
| Operating Temperature | 110° F. Continuous (150° F. Limited Use) |
| Pump By-Pass | Approximately 100 PSI |
| Maximum Viscosity | 2000 SUS |
| Suitable Seal and Gasket Material | Viton ® |
| Electrical Service | 120 Volts, 15.2 Amps, Single Phase, 60 Hz (electric version only) |

Perceived advantages of the present invention include increased lubrication life; possibility to run at higher speeds; reduction in required oil level; maintain bearing life while consuming less oil; portability.

BRIEF DESCRIPTION OF THE DRAWINGS

FIG. 1 is a perspective view of the present invention;
FIG. 2 is a side plan view of the portable system illustrated in FIG. 1.

DESCRIPTION OF THE PREFERRED EMBODIMENT

Figure 3:
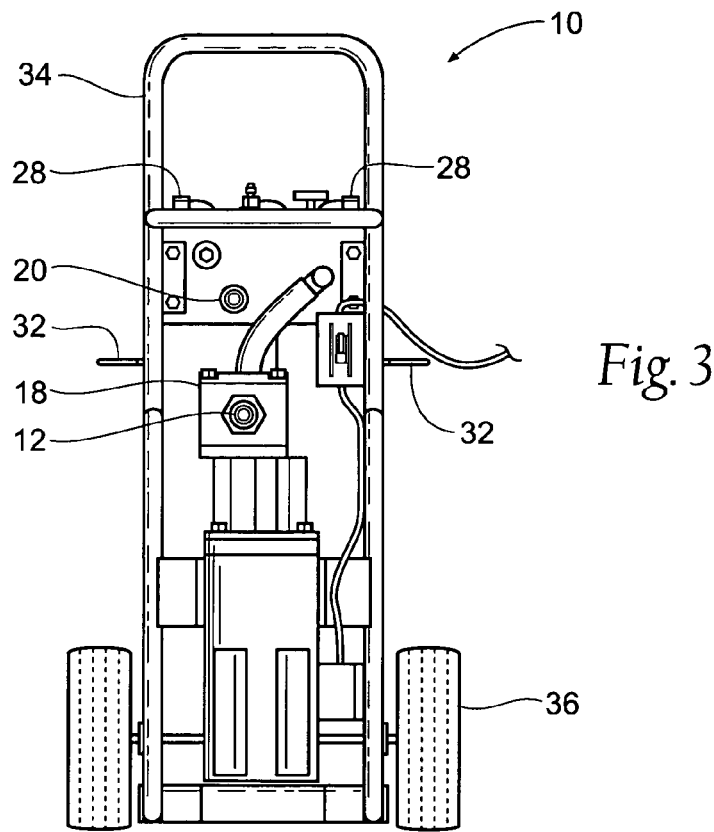
FIG. 3 is a rear plan view of the portable system illustrated in FIGS. 1 and 2.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

As may be seen in the Figures, the present portable lubricant filtration system 10 generally includes a lubricant inlet 12, through which lubricant is received into the system 10, at least one filter element 14, a distribution and control manifold 16, and either an electrical pump 18, preferably a internal gear pump, or pneumatic unit (not shown) if air driven pumps are available, or any other operable type of pumping mechanism. The lubricant inlet 12, may be coupled externally to a conventional retrieval wand system (not shown) to facilitate the intake of lubricant from various sources.

From the lubricant intake inlet 12, the lubricant is transferred into a filter element 14 by way of pump head 18 via manifold 16. The filter element 14 is preferably a spin-on type filter and is coupled to the manifold 16 by way of a threaded connection. Lubricant is forced through one or more filter elements 14 where impurities including water are removed, into outlet 20, and ultimately through a wand element (not shown) for dispensing of the filtered lubricant.

In a preferred embodiment, filter element(s) 14 and manifold 16 are coupled to an industrial grade electric gear pump, although, any-pump type, such as pneumatic, or direct motor driven pumps may be employed.

Figure 4:
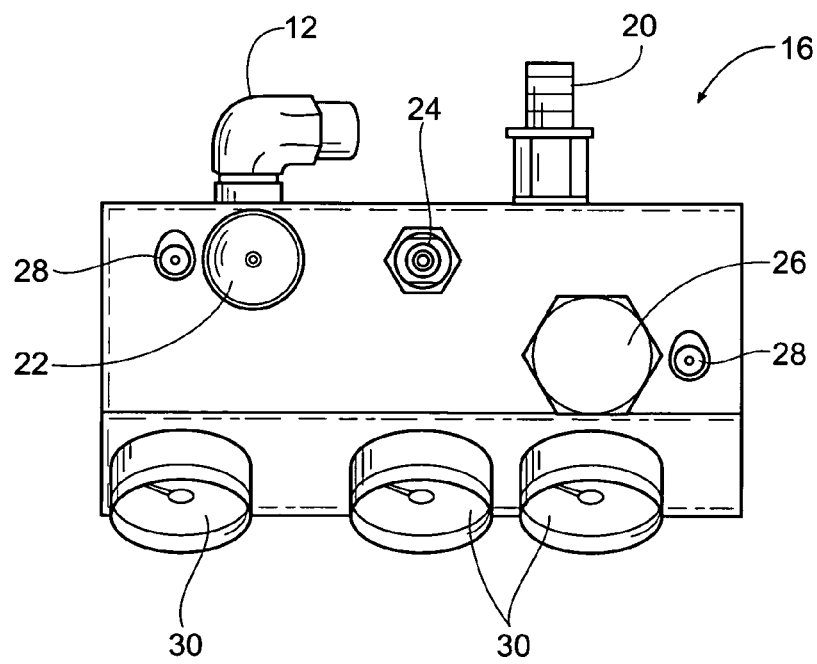
FIG. 4 is a top view of a manifold unit for use in conjunction with the present lubricant filtration system.
Figure 5:
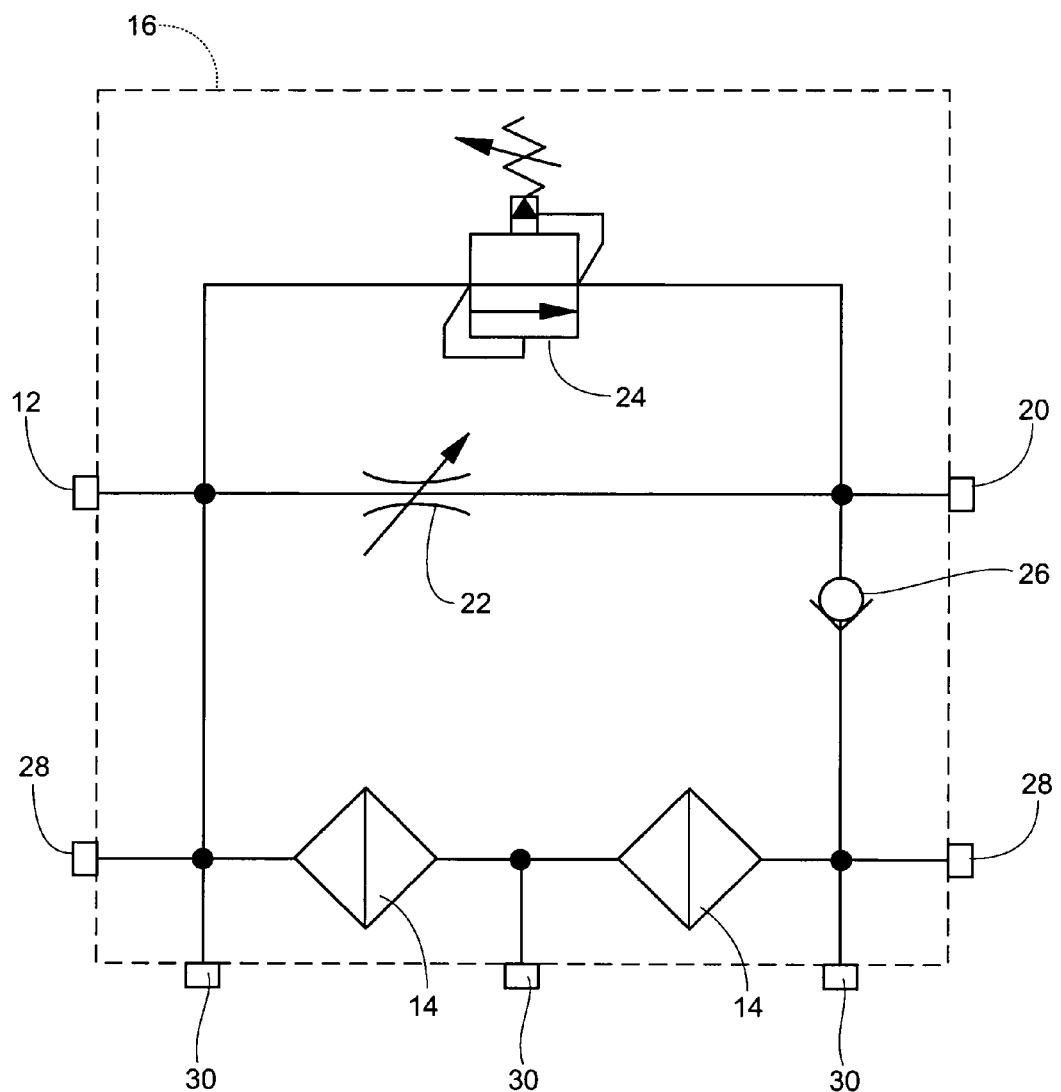
FIG. 5 is a schematic diagram of a manifold unit for use with a lubricant filtration system as shown in FIG. 4.
Figure 6:
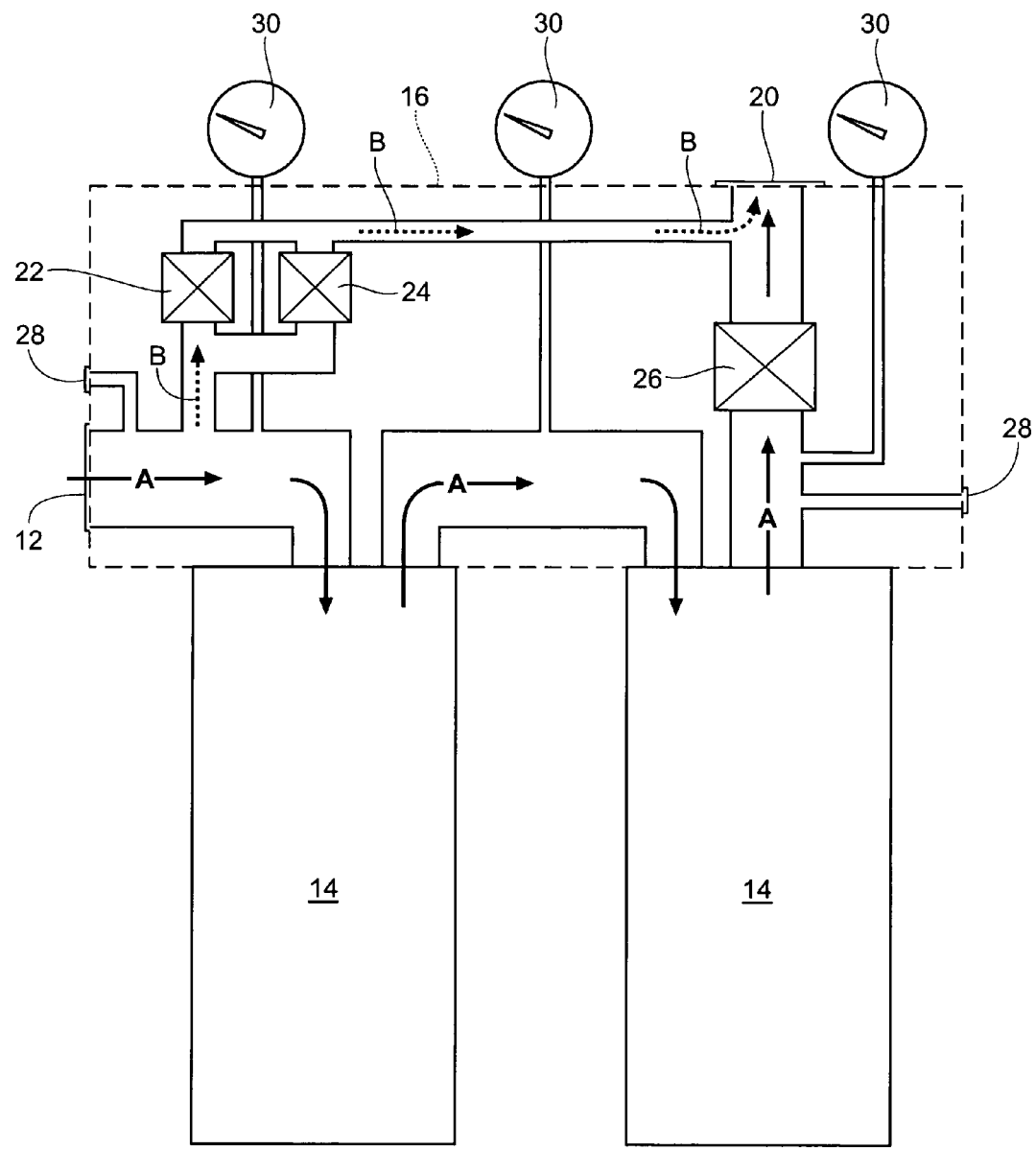
FIG. 6 is a schematic view illustrating fluid flow through a manifold according to the present invention.

With particular attention to FIGS. 4, 5, and 6 the distribution and control manifold 16 may be seen. As shown, the manifold 16 preferably includes an inlet 12, an output 20, bypass needle valve 22, conventional relief valve 24, check valve 26 for insuring direction of lubricant flow, and at least one sample port 28. The manifold 16, is further provided with at least one pressure gauge 30 at the upstream and downstream of each filter element 14. The gauges 30 are provided to detect pressure differential in the system 10 which may indicate deterioration of the filter element(s) 14. Deterioration of the filter element(s) 14 may indicate the need to replace the filter element(s) 14 to maintain filtration efficacy and reduce system downtime.

The manifold 16 is adapted to receive threaded or other easily detachable filter, elements 14, such that each filter element 14 is easily detachable from the manifold 16. This arrangement ensures that changing filter elements 14 after contamination can be readily and facilely be accomplished. With specific reference now to FIG. 6, fluid flow through the manifold 16 may be seen. Lubricant (not shown) enters the manifold 16 via intake 12 and, in usual operation, travels in the direction of arrows A to filter elements 14 and outlet 20. In bypass operation, the lubricant may, after entering the manifold 16 and intake 12, travel in the direction of arrows B through needle bypass valve 22 or relief valve 24 to outlet 20.

As may be observed, sample ports 28 may be positioned to allow lubricant sampling at various points along the filtration process. For example, and as seen in FIG. 6, a sample port 28 may be positioned proximate the intake for baseline sampling of incoming lubricant, with an additional sample port 28 located along the stream path after the lubricant has passed through the filters 14 to monitor filtration effectiveness.

Referring now to FIG. 3, the rear view of components of the lubricant filtration system 10 of the present invention is shown. Brackets 32 serve as convenient hangers for carrying tubular wands (not shown) for use with the system 10. As may be further seen, the present system is provided with a frame 34 to support the various system elements, and wheels 36 for ease in portability.

A method of filtration using the present system may include the steps of:
providing a filtration system having an inlet, an outlet, and at least one filter;
introducing a lubricant to be filtered into the inlet;
moving the lubricant along a fluid path toward the at least one filter;
filtering the lubricant in the at least one filter;
providing the system with at least one sample port;
removing the lubricant from the system through the outlet.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A portable lubricant filtration system including:
   a supporting frame comprising a frame carried by wheels;
   a lubricant pump having an inlet for coupling to and receiving lubricant from an external source;
   a lubricant transport manifold unit, said manifold unit comprising a lubricant inlet coupled to said pump, and a filtered lubricant outlet for coupling to and transmitting filtered lubricant back to said external source;
   a first replaceable lubricant filter element, said first filter element fluidically communicating with said lubricant inlet and said filtered lubricant outlet and carried by said manifold unit;
   a second replaceable lubricant filter element, said second filter element fluidically connected in series between said first replaceable lubricant element and said filtered lubricant outlet and carried by said manifold unit;
   at least one pressure gauge for measuring pressure differential between said first and second filter elements;
   a bypass line included in said manifold, having a needle valve therein and being capable of placing said lubricant inlet and said filtered lubricant outlet in fluid communication via manipulation of said needle valve;
   at least one lubricant sampling port, said at least one lubrication sampling port being in fluid communication with at least one of said first and second filter elements; and
   a check valve positioned between said second filter element and said filtered lubricant outlet, said check valve positioned to control direction of lubricant flow.

* * * * *